June 16, 1925.  1,542,791
C. E. VEIL-PICARD
PROCESS FOR MANUFACTURING ELASTIC TIRES WITH
RECESSES FILLED WITH AIR UNDER PRESSURE
Filed June 22, 1922   2 Sheets-Sheet 2
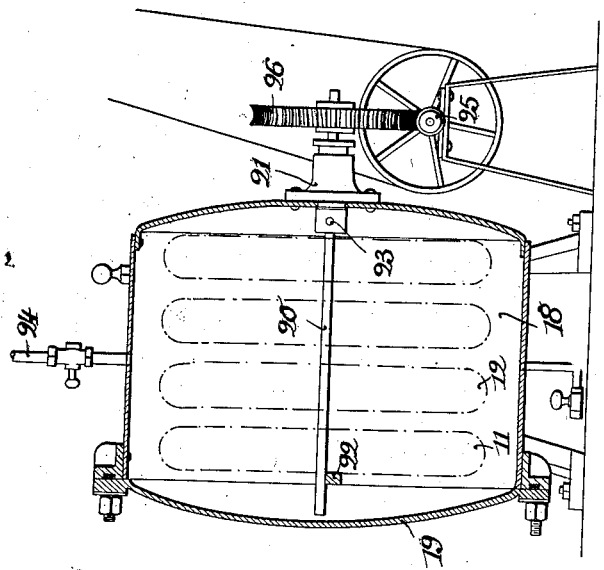
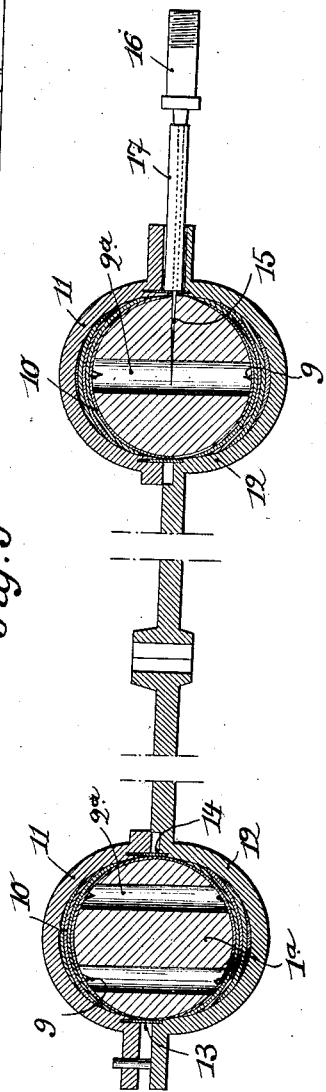
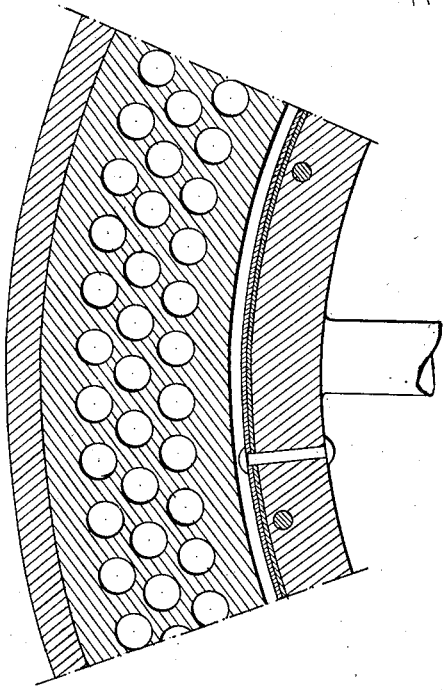
INVENTOR
Charles Edmond Veil-Picard
Munn & Co.
Attorneys Patented June 16, 1925.

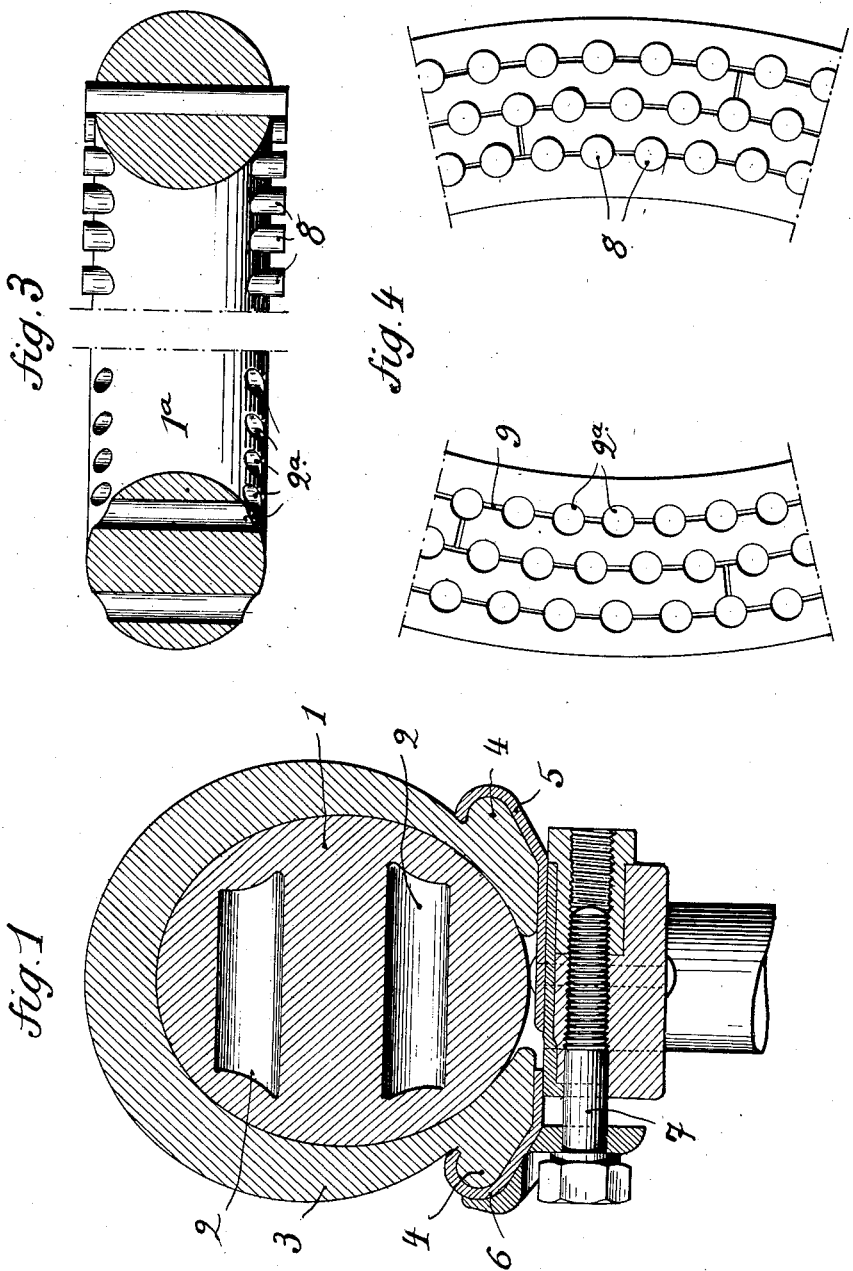

1,542,791

UNITED STATES PATENT OFFICE.

CHARLES EDMOND VEIL-PICARD, OF PARIS, FRANCE.

PROCESS FOR MANUFACTURING ELASTIC TIRES WITH RECESSES FILLED WITH AIR UNDER PRESSURE.

Application filed June 22, 1922. Serial No. 570,060.

*To all whom it may concern:*

Be it known that I, CHARLES EDMOND VEIL-PICARD, a citizen of the Republic of France, and residing at Paris, Seine Department, No. 76 Avenue de Wagram, in the Republic of France, Industrial, have invented certain new and useful Processes for Manufacturing Elastic Tires With Recesses Filled With Air Under Pressure, of which the following is a specification.

This invention relates to an improved elastic tire and a process and apparatus for the manufacture of the same.

The said tire comprises on the one hand a rubber ring in whose mass are provided a plurality of closed cavities in separate disposition and filled with an elastic fluid at high pressure, and on the other hand an envelope analogous to the envelopes of pneumatic tires but specially constructed in order to effect upon said ring when mounted on the wheel rim a compression whereby the fluid in said cavities can be brought to any desired pressure, corresponding to the weight of the vehicle, this being impossible to carry out by the use of a pump as for the known tires, inasmuch as the said cavities are separate from each other.

It would be difficult to undertake the manufacture of a ring as above mentioned solely by the use of the known means, as it would be necessary to fill the cavities with compressed fluid before vulcanizing the rubber, and to carry out the vulcanizing in the presence of fluid under pressure without causing the deformation of the cavities and their definite communication with each other, or a loss of strength of the cavities by reason of movements of heated material within the mould. According to my invention, the said drawbacks are obviated especially by giving to said ring together with its containing mould, during the vulcanizing process, a continuous or intermittent rotation upon its axle which is in the horizontal position.

The accompanying drawings which are given by way of example set forth a tire according to the invention, as well as the apparatus for manufacturing the same.

Fig. 1 is a cross-section of the tire and the wheel rim carrying the same.

Fig. 2 is a lengthwise section of the same.

Fig. 3 is a diametral section of a rubber ring in process of manufacture, and,

Fig. 4 is a plan view of the same.

Fig. 5 is a diametral section of a mould containing the ring to be vulcanized.

Fig. 6 is a vertical section of a vulcanizing apparatus.

In Figs. 1 and 2, 1 indicates the rubber ring in the mass whereof are formed the cavities 2 of cylindrical shape, situated parallel to the axis of the wheel and in staggered disposition. The said cavities are closed at each end, separated from each other, and are filled in all cases with an elastic fluid under pressure such as air, nitrogen, or the like. The ring 1 is covered and held in the compressed state upon the wheel by the envelope 3 having the flanges 4, whose mounting and tension are obtained by means of a wheel rim made in two parts comprising a fixed rim 5 and a movable rim 6 which are connected by a plurality of transverse bolts 7.

By reason of its elasticity and the pressure of the gases which it contains, the ring 1 when in the free state is inflated in such manner that the pressure of said gases would be generally insufficient to support the weight of a vehicle, and the tire would become flattened to an excessive degree were not the pressure increased by adequate means. This result is preferably obtained by employing an envelope of suitably chosen dimensions, which is tightly stretched upon the ring 1. In order to obtain a sufficient compression, it is necessary to provide longer bolts than are herein represented, for the commencement of the tightening. When the required pressure is obtained, that is when the cross-section of the ring 1 is sufficiently reduced to bring the gas pressure in the cavities to the required degree, the said long bolts are replaced one by one by much shorter bolts such as are here shown. It is obvious that any other suitable means could be used to provide a strong tension of the envelope upon the ring 1 and to maintain the same compressed, without departing from the principle of the invention.

To carry out the practical manufacture of a rubber ring such as 1 with cavities inflated with gas under pressure, the following process for example can be employed:

A cylindrical piece of rubber of round section is employed to constitute a ring $1^a$ wherein are formed with the desired spacing a plurality of apertures $2^a$, Fig. 3, parallel to the axis of the ring. One disposes in said apertures the metal tubes 8 which serve to give the apertures their definite shape as desired, and the whole is immersed in cold water for example for 24 hours. At the end of this time the tubes can be removed without apprehension that the mass will undergo deformation in a spontaneous manner and that the apertures will thus be changed in shape or obstructed.

In the surface of the ring are formed by the use of suitable tools a set of grooves 9 serving to connect together the apertures $2^a$ in a temporary manner when the ring is held in the mould used in the heating process. Before placing the ring in the mould, one cements to each side of the ring the rubber caps 10 composed for example of a plurality of superposed bands, and intended to close the ends of the apertures $2^a$.

The mould is composed of two annular portions 11 and 12 whereof the joints are preferably provided with thin metal hoops 13, 14, which come flush with the internal wall and prevent the rubber from escaping between the adjacent edges of these two parts under the action of the heat and pressure during the vulcanizing process. The ring $1^a$ provided with its rubber caps 10 is placed in the mould without pressing down the latter, for example by disposing strips of suitable thickness between the edges of the mould in order that the grooves 9 shall not be obstructed under the effect of the pressure. One then proceeds to introduce the compressed gas, nitrogen, air or the like, by the use of a hollow needle 15 which is connected by a flexible tube with a reservoir of compressed gas, and said needle is inserted into the tire so as to cause the gas to enter one of the cavities $2^a$, whence it will proceed in turn into all the other cavities through the communicating grooves 9. 16 indicates a valve and 17 a rubber sleeve forming a joint. When the filling is completed, the needle as well as the strips, are removed, and the mould is pressed together to its full extent.

The vulcanizing is effected in a receptacle 18, Fig. 6, provided with a hermetically closing door 19 and a shaft 20 serving to rotate the moulds during the operation. The said shaft is supported at one end in a stuffing box disposed in the end of the receptacle, and at the side adjacent the door by a removable cross-piece 22; the shaft is preferably jointed at 23. The door being opened and said cross-piece removed, it is an easy operation to slide upon the shaft a number of moulds 11, 12 having an aperture at the central part which is adapted to fit upon said shaft so as to provide for the entraining of the moulds in the sense of the rotation. One then places the cross-piece 22 in position in order to support said shaft in the horizontal sense, then the door is closed and steam is sent into said receptacle at suitable temperature and pressure through a pipe 24. The shaft 20 is then set in rotation for example by means of a belt driving a speed-reducing device 25, 26, so as to give to the moulds a suitable speed of rotation which will prevent the displacement of the rubber by reason of its own weight during the heating process. The structure of the ring is thus perfectly maintained during the whole of the vulcanizing process.

Under the action of the temperature and the pressure, the grooves 9 are closed up and the cavities 2 become absolutely separated from each other, such as is necessary in order that the accidental puncture of a cavity shall not cause the leakage of the entire tire. Upon removal from the mould, after cooling the mould, the tire will considerably increase in volume while at the same time the pressure of the gas in said cavities becomes correspondingly reduced, for example by one-half. As above stated, the high pressure which is necessary may be recovered during the mounting of the tire by the compression produced by means of the envelope.

The walls of the cavities have sufficient thickness to support a pressure of several kilogrammes per square centimetre, even when the rubber ring is not enclosed in an envelope, and even though said walls are not strengthened by any canvas pieces. From this it will result that if when travelling on the road, one or more of the said cavities should be punctured, the tire can nevertheless continue to operate in almost as good conditions.

In the said form of construction, it has been supposed that the process started with a rubber piece of round section and of sufficient length to form the desired ring in a single piece, but it is obvious that one could use instead of such piece, a plurality of pieces of a shorter length and of round or half-round section, these being cut in the perpendicular sense or bevelled, and assembled by cementing either before or after the perforation. Furthermore, instead of obtaining the final compression of the ring with the cavities by bringing together the edges of the envelope, like means of a substantially equivalent nature may be used, for example employing an expanding wheel rim or expanding elements disposed between the wheel rim and the rubber rim, or the like.

It is to be understood that the present invention comprises all applications of the process which consists in the rotation of the object to be vulcanized during the vulcanizing process in order to prevent any movement of the pasty rubber towards the lower part of the mould and to afford the maintenance of the internal structure of said object in spite of the action of gravity and irrespectively of the pressure in the mould. It is obvious that one could employ for this purpose any suitable forms of moulds and vulcanizing apparatus and vary the driving means used for the rotation of the moulds.

Claims.

1. Process of manufacture of a pneumatic tire comprising an india-rubber ring in the body of which are provided recesses arranged at right angle to the middle plane of this ring and tightly closed by means of india-rubber caps, the whole being enclosed within a casing or cover, this process comprising, before the setting of the caps upon the recesses, the provision in the surface of the ring formed of pure india-rubber, of a series of grooves adapted to cause the recesses to communicate the one with the other when they are covered by the caps, the introduction of air under pressure into the recesses through the medium of a needle introduced into a single of these recesses, and the vulcanization of the ring thus inflated, this vulcanization having for effect to fill the said grooves so as to insulate the one from the other, the recesses filled with air under pressure.

2. The method of manufacturing pneumatic tires of the character described, consisting in forming a solid ring with openings parallel to the axis of the ring and with grooves on its surface connecting the openings, cementing bands on the ring over the ends of the openings to close the same, placing the ring in a partially closed mold, introducing air under pressure into one of the said openings, closing the mold so as to apply pressure to the ring, and vulcanizing the ring in the mold, whereby the groove will be closed and the tire formed with a plurality of separate and independent cavities filled with air.

In testimony that I claim the foregoing as my invention, I have signed my name in presence of two subscribing witnesses.

CHARLES EDMOND VEIL-PICARD.